(12) United States Patent
Michalek

(10) Patent No.: US 11,537,411 B1
(45) Date of Patent: Dec. 27, 2022

(54) INTER-ENVIRONMENT COMMUNICATION WITH ENVIRONMENT ISOLATION

(71) Applicant: BMC Software, Inc., Houston, TX (US)

(72) Inventor: Gary J. Michalek, Northville, MI (US)

(73) Assignee: BMC Software, Inc., Houston, TX (US)

( * ) Notice: Subject to any disclaimer, the term of this patent is extended or adjusted under 35 U.S.C. 154(b) by 26 days.

(21) Appl. No.: 17/444,189

(22) Filed: Jul. 31, 2021

(51) Int. Cl.
- G06F 9/445 (2018.01)
- G06F 9/52 (2006.01)
- G06F 9/34 (2018.01)
- G06F 9/30 (2018.01)

(52) U.S. Cl.
CPC ...... *G06F 9/44521* (2013.01); *G06F 9/30174* (2013.01); *G06F 9/342* (2013.01); *G06F 9/526* (2013.01)

(58) Field of Classification Search
None
See application file for complete search history.

(56) References Cited

U.S. PATENT DOCUMENTS

| | | | | |
|---|---|---|---|---|
| 6,199,202 B1* | 3/2001 | Coutant | ............. | G06F 9/44521 717/138 |
| 6,631,516 B1* | 10/2003 | Baumgart | ................. | G06F 8/54 717/162 |
| 7,171,543 B1* | 1/2007 | Ronen | ..................... | G06F 9/342 711/212 |
| 2012/0117553 A1* | 5/2012 | Kielstra | ............. | G06F 9/44536 717/163 |
| 2020/0117524 A1* | 4/2020 | Kielstra | ................. | G06F 9/541 |
| 2020/0192730 A1* | 6/2020 | Li | ........................ | G06F 9/547 |
| 2021/0240495 A1* | 8/2021 | Liu | ..................... | G06F 9/30134 |
| 2021/0373917 A1* | 12/2021 | Tang | ................... | G06F 9/44594 |

OTHER PUBLICATIONS

IBM, "Using standard macros," available online at <https://www.ibm.com/docs/en/zos/2.3.0?topic=programs-using-standard-macros#cbc1p2-gen240>, Mar. 3, 2021, 2 pages.

IBM, "XPLINK Assembler," available online at <https://www.ibm.com/docs/en/zos/2.3.0?topic=programs-xplink-assembler>, Mar. 3, 2021, 3 pages.

M. Ebbers et al. "Introduction to the New Mainframe z/OS Basics," available online at <https://www.redbooks.ibm.com/redbooks/pdfs/sg246366.pdf >, Mar. 2011, 792 pages.

S. Comstock: "z/OS, Language Environment, and UNIX How They Work Together," available online at <http://www.kcats.org/csci/567/doc/zos_unix.pdf>, 2002, 158 pages.

* cited by examiner

Primary Examiner — Qing Chen
(74) Attorney, Agent, or Firm — Brake Hughes Bellermann LLP (57) ABSTRACT

Described techniques enable inter-environment communication, including isolating two runtime environments from one another as needed to ensure that operations of one runtime environment do not negatively affect operations of the other runtime environment during the inter-environment communication. Such isolation may be maintained when the two runtime environments use different addressing schemes, and when the two runtime environments use different call linkage techniques for identifying, locating, and passing stored parameters or other data.

20 Claims, 4 Drawing Sheets

INTER-ENVIRONMENT COMMUNICATION WITH ENVIRONMENT ISOLATION

TECHNICAL FIELD

This description relates to communication between multiple computing environments.

BACKGROUND

Computing techniques have evolved and developed continuously since the beginning of the computing era. In some cases, new software has been developed for use with existing hardware resources. In other cases, new hardware has been developed that enables software techniques that would not have been feasible with a preceding generation of hardware.

Such technology developments have occurred, and continue to occur, together with constraints imposed by many different types of pragmatic limitations, such as time, cost, risk, and convenience. For example, many businesses have developed, deployed, and used computing platforms that provide suitably fast and reliable services for themselves and for their customers. Even if new hardware and software are available to such businesses, or other entities, the businesses may be unable or unwilling to modify or replace existing systems.

SUMMARY

According to general aspects, computer program product may be tangibly embodied on a non-transitory computer-readable storage medium and may include instructions. When executed by at least one computing device, the instructions may be configured to cause the at least one computing device to receive, from a first application executing in a first runtime environment having a first address mode, at least one instruction, such as an instruction to call for at least one parameter, and change the first address mode to a second address mode. When executed by at least one computing device, the instructions may be configured to cause the at least one computing device to execute a linkage conversion from a first linkage convention to a second linkage convention, the first linkage convention being compatible with the first runtime environment and the first address mode, and the second linkage convention being compatible with a second runtime environment and the second address mode. When executed by at least one computing device, the instructions may be configured to cause the at least one computing device to isolate execution of the second runtime environment from execution of the first runtime environment within an operating system of the at least one computing device. When executed by at least one computing device, the instructions may be configured to cause the at least one computing device to provide the at least one instruction to the second runtime environment, using the second linkage convention, and provide control to the second runtime environment to execute the at least one instruction, e.g. to execute the call for at least one parameter value of the at least one parameter, by a second application running in the second runtime environment. When executed by at least one computing device, the instructions may be configured to cause the at least one computing device to receive the at least one parameter value, using the second linkage convention.

According to other general aspects, a computer-implemented method may perform the instructions of the computer program product. According to other general aspects, a system, such as a mainframe system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Described systems and techniques provide mainframe systems and techniques that enable continued use of existing mainframe resources, even as new mainframe resources are developed and used. For example, many businesses developed mainframe services using best-available mainframe resources at a time of development. Such mainframe services may be extremely valuable to the businesses using them. For example, such mainframe services may provide core functionalities in healthcare, banking, or industrial settings, may store and process vast amounts of data for millions of customers, and may have been in use for multiple decades. Such services may be referred to herein in some examples as legacy services, or legacy applications.

As new hardware and software resources have been developed, new mainframe services have also been developed to leverage advantages found in the new resources. For example, earlier generations of mainframe systems may use 24-bit or 32-bit addressing. More recent generations may use 64-bit addressing. Larger address spaces mean that more instructions may be processed and more data may be stored in each processing cycle, which means that, all else being equal, mainframe services may be provided faster and in greater volume. For example, larger address spaces make it easier to assign users desired amounts of virtual storage and related computing resources.

In some addressing schemes, one or more bits of an address may be reserved for some designated purpose and are not included or used for addressing. For example, a first bit or last bit of a 32-bit word may be used to facilitate compatibility with earlier addressing schemes, e.g., by designating information about how to use a remainder of the word. For example, a first bit being set to either 0 or 1 may indicate whether to use all remaining 31 bits of the word as an address, or to use only a lower 24 bits as an address (e.g., for compatibility with earlier 24-bit addressing schemes). Therefore, such systems may be referred to as using 31-bit addressing, even if 32-bit registers are used.

Many efforts have been made to ensure compatibility between systems and applications using different addressing schemes. The difficulty of doing so, however, is compounded by many other factors, including other factors related to optimizing performance of mainframe systems.

For example, in addition to managing the types of addressing schemes referenced above, an operating system (OS) of a mainframe system may implement one or more types of runtime environments for various programming languages. For example, programs written in various programming languages, such as C, C++, COBOL, Fortran, PL/I, and Java, may be compiled using language-specific compilers. Resulting, compiled programs may require different architectural constructs, interfaces, and libraries to perform the same or similar functions, which may be duplicative, incompatible, or otherwise problematic.

To avoid such difficulties, it is possible to provide a runtime environment that includes a common or compatible version of the types of runtime services just referenced. Such a runtime environment enables compiling and running programs written in any and all of the referenced languages (which may be referred to as high-level languages (HLLs)), as well as lower-level languages, such as assembly language programs, including Assembler language from IBM. While advantageous for these purposes, it may be difficult for the mainframe OS to manage and implement such runtime environments, while simultaneously maintaining compatibility between multiple addressing schemes.

For example, a first instance of a runtime environment using a first addressing scheme may be incompatible with, and may be unable to access or otherwise utilize, a second instance of the runtime environment using a second addressing scheme. In a more particular example, described in detail below, a 64-bit program running in a 64-bit runtime environment may be unable to invoke a 31-bit program running in a 31-bit runtime environment.

Techniques described herein resolve the above difficulties by enabling inter-environment communication, including isolating the two environments from one another as needed to ensure that operations of one runtime environment do not negatively affect operations of the other runtime environment. Such isolation may be maintained even when the two runtime environments use different addressing schemes, and even when operation control is handed off between the two runtime environments multiple times to enable multiple interactions (e.g., calls for data) within one invocation.

Described techniques also ensure that data requested by a program in one of the runtime environments may be obtained from the other runtime environment, notwithstanding the above-referenced isolation, and even when the two runtime environments use different data management techniques. For example, different call linkage techniques for identifying, locating, and passing stored parameters or other data may be used by the two different runtime environments, and described techniques may provide linkage conversion between the two runtime environments.

Figure 1:
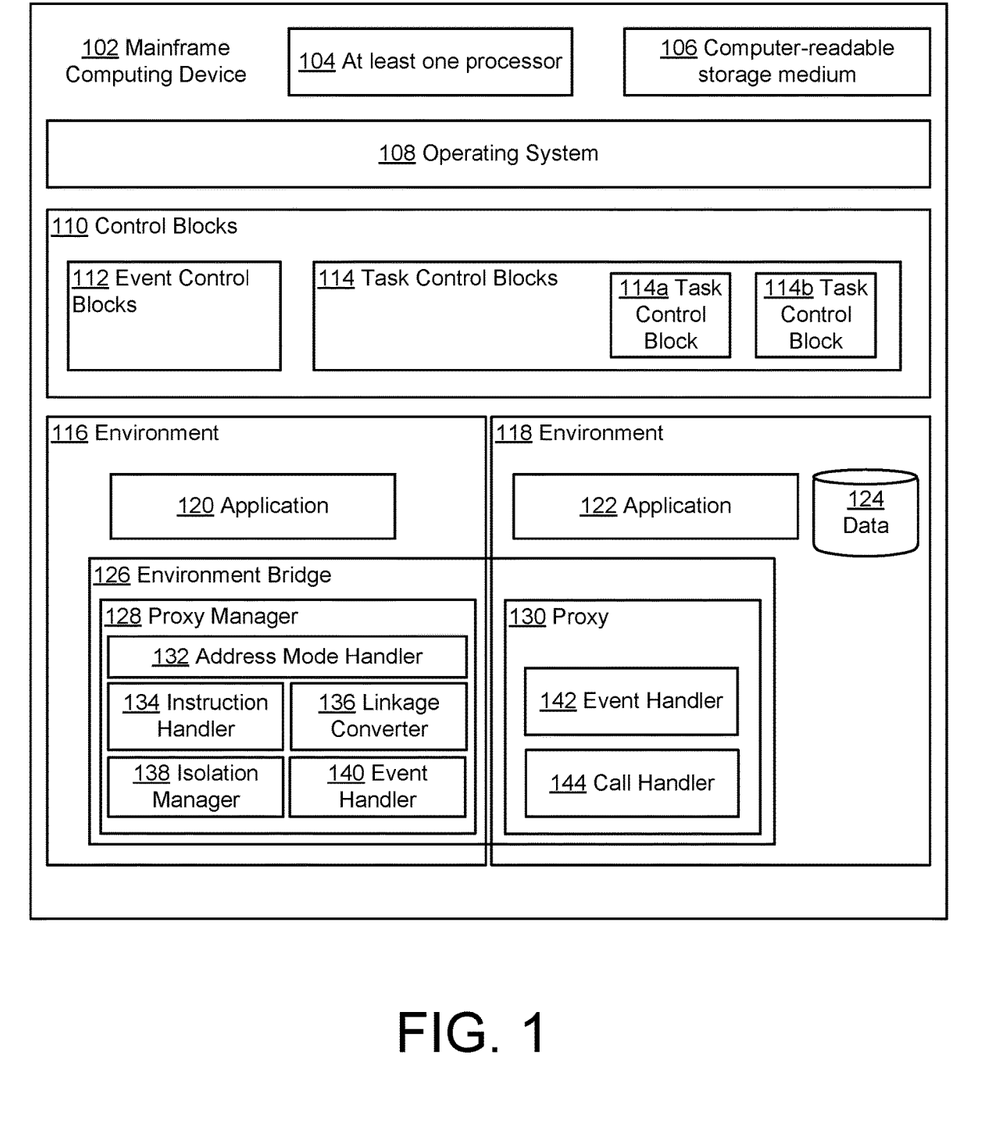
FIG. 1 is a block diagram of a system for inter-environment communication with environment isolation.

FIG. 1 is a block diagram of a system for inter-environment communication with environment isolation. In FIG. 1, a mainframe computing device 102, which may be referred to herein as a mainframe computer or mainframe, refers to any computer, or combination of computers in communication with one another, that is used to implement the types of mainframe services referenced above, including the more specific examples provided below.

As is known, the mainframe 102 may be deployed by a business owner or organization, e.g., to support business functions. The mainframe 102 may support many different workstations or peripheral devices, or otherwise provide access and business functions to employees, administrators, customers, or other users.

The mainframe 102 is illustrated as including at least one processor 104 and computer readable storage medium 106. As the mainframe 102 supports business-critical functions for many (e.g., millions) of users, the at least one processor 104 may be understood to represent many different processors providing significant quantities of processing power. Similarly, the computer readable storage medium 106 represents large quantities of various types of memory (e.g., registers, main memory, or bulk/secondary memory) that may be used to store instructions executable by the at least one processor 104, as well as to store data (e.g., business data, including customer data).

In addition to providing large quantities of processing and memory resources, the mainframe 102 should be understood to provide many other features and advantages, some of which are described herein by way of example. To assist in providing these features and advantages, an operating system (OS) 108 may be configured to, and optimized for, characteristics and functions of the mainframe 102. The OS 108 may, for example, provide task scheduling, application execution, and peripheral control. Put another way, the OS 108 enables use of the at least one processor 104 and the computer-readable storage medium 106 across many different use cases of the mainframe 102.

Some techniques that the OS 108 may use involve control blocks 110. A control block generally refers to or includes a portion or unit of memory used to store data that may be leveraged by the OS 108 to perform duties of the OS 108. Such duties include, as referenced, scheduling tasks within and among applications, and otherwise enabling execution of a plurality of applications, services, sessions, or other functions of the mainframe 102.

One example of a control block is known as an event control block(s) 112. The event control blocks 112 may be used to manage specific events, including the posting (e.g., providing notification) of a completion of an event for which the OS (and/or an application or service) is waiting.

Another example of a type of control block are task control blocks 114. Task control blocks 114 contain any or all data needed for execution of a particular task. Task control blocks 114 may be used to enable multi-tasking by the mainframe 102, including sharing of (e.g., competing for) resources of the at least one processor 104 and the computer-readable storage medium 106. For example, an application executing on the mainframe 102 may use task control blocks 114 to perform two tasks of the application in parallel.

Further in FIG. 1, a runtime environment 116 represents a runtime environment having a first address space, e.g., a 64-bit addressing scheme. A runtime environment 118 represents a runtime environment having a second address space, e.g., a 31-bit addressing scheme. For example, the runtime environment 116 and the runtime environment 118 may be understood to represent separate instances, having separate characteristics, of an underlying environment. For example, the runtime environment 116 and the runtime environment 118 may both represent separate instances of a particular type of runtime environment, such as Language Environment (LE) from IBM.

The runtime environment 116 is illustrated as including an application 120, while the runtime environment 118 is illustrated as including an application 122. The application 120 and the application 122 may represent any application (s) suitable for execution by the mainframe 102.

For example, the application 122 may refer to, and represent, the type of legacy mainframe service(s) referenced above. The application 122 may thus be written and compiled in the context of an earlier addressing scheme, such as the 31-bit addressing scheme referenced above. The application 122 may have been successfully compiled and deployed many years ago and may be providing its intended functions in a desirable and reliable manner.

For example, data 124 represents data stored in conjunction with, and used by, the application 122. For example, the data 124 may represent customer or transaction data of a business that may include many millions of data records. The data 124 may be stored and accessed by the application 122 using existing formats, addressing schemes, and interfaces.

It may be possible to re-write, re-compile, or otherwise update the application 122, e.g., to take advantage of an updated addressing scheme (e.g., 64-bit addressing) and other advancements in mainframe computing. However, such updates or other changes may incur extreme risk, expense, and inconvenience for an owner or operator of the mainframe 102.

For example, if the application 122 is supporting day-to-day operations of a business, including millions of customer transactions, deploying an updated version of the application 122 entails risks of malfunction of the updated version. Such malfunctions may have extremely negative consequences to the business, such as failed customer transactions and general customer dissatisfaction. Moreover, updating the application 122 may be extremely costly and time-consuming.

For these and other reasons, the system of FIG. 1 enables the application 120 within the runtime environment 116 to interact with the application 122 (including accessing the data 124), without requiring modifications to the runtime environment 118, the application 122, or the data 124. For example, an environment bridge 126 may be configured to interact with the runtime environment 116 and the runtime environment 118 to enable and facilitate communications between the application 120 and the application 122.

In the example of FIG. 1, the environment bridge 126 is illustrated as including a proxy manager 128 in the environment 116, which is configured to manage a proxy 130 operating in the environment 118. As described in detail, below, the proxy manager 128 and the proxy 130 may be used to isolate operations of the environments 116, 118, as well as operations of the applications 120, 122, from one another, using the control blocks 110.

In the following examples, use case scenarios are described in which the environment 116 is implemented using a 64-bit address mode, such as an instance of a 64-bit LE, while the environment 118 is implemented using a 31-bit address mode, such as an instance of a 31-bit LE. However, it will be appreciated from the above description, and generally, that the environments 116 and 118 may be implemented using any two suitable address modes.

As also referenced above, compatibility between applications or programs using different address modes is a known problem, and many partial solutions exist that have been designed to alleviate this problem and related problems. However, such partial solutions do not resolve all use cases in which such difficulties arise.

For example, additional constraints and requirements may be present that may hinder or prevent compatibility. For example, the environment 116, in addition to operating using a 64-bit address mode, may require specific use of registers, or other memories or memory structures, to call and retrieve data. In other examples, the environment 116 may require specific uses of, or constraints on, the task control blocks 114.

To solve these and other compatibility issues, the proxy manager 128 includes an address mode handler 132 that is configured to enable the proxy manager 128 to exist within, and interact with, the environment 116 (e.g., in a 64-bit address mode), while still enabling interactions with the proxy 130 (e.g., in a 31-bit address mode).

For example, the proxy manager 128 may be written in Assembler language, and the address mode handler 132 may be configured to execute a macro program designed to wrap, and provide a load module for, the proxy manager 128 with respect to the environment 116, so that the proxy manager 128 is compatible with the 64-bit address mode environment 116. The address mode handler 132 also may be configured to then switch from a 64-bit address mode to a 31-bit address mode. Specific examples for such operations of the address mode handler 132 are provided in more detail, below, or would be apparent to one of skill in the art.

Further in the example of FIG. 1, the application 120 is designed to call for specific parameter values from the application 122, e.g., from the data 124. In an example, the application 120 may be designed to call for customer data from the data 124. For example, customer data for a particular, individual customer may be stored within a defined data structure that includes predetermined fields for that customer.

More generally, the term parameter as used herein may refer to any data that may be requested by the application 120 from the application 122. For example, a parameter may include an integer or a memory address. For example, in the example above of customer data, the parameter may be a memory address at which all of the customer data for a particular customer is stored, e.g., within a particular block of data having many different fields.

An instruction handler 134 may therefore be configured to designate an instruction to be followed, e.g. a parameter(s) to be called, using an existing program linkage convention that is used by the application 120 within the environment 116. As described herein, such program linkage, or linkage, refers to any technique(s) used to enable separately assembled control sections to work together, including transfers of execution and passing of data. Linkage conventions refer to specific techniques designating responsibilities of cooperating programs.

For example, one type of linkage is referred to as Extra Performance Linkage, or)(PLINK.)(PLINK is a call linkage between programs that is optimized for an environment of frequent calls between small functions or subprograms.) (PLINK may be used in a 64-bit address mode environment, such as the environment 116. However, the environment 118, e.g., a 31-bit address mode environment, may use a different linkage convention, such as the standard linkage convention.

Therefore, the proxy manager 128 includes a linkage converter 136, which may be configured to convert a first linkage convention, used by the instruction handler 134, the application 120, and the environment 116, to a second linkage convention that is compatible with the proxy 130, the application 122, and the environment 118. Specific examples of such linkage conversions are provided herein in detail, below.

Additionally, the proxy manager 128 includes an isolation manager 138, which may be configured to isolate the environment 118 and thus the application 122, from the environment 116. Specifically, the isolation manager 138 may be configured to ensure that the environment 116 utilizes a separate one(s) of the task control blocks 114 than the environment 118. This isolation is illustrated in FIG. 1 using a task control block 114*a* dedicated to the environment 116, and a task control block 114*b* dedicated to the environment 118. In contrast, in conventional systems, attempts to call the environment 118 from the environment 116 result in overlapping executions of both of the environments 116 and 118 within a single task control block, leading to incompatibilities, generation of errors, and malfunctions.

Once suitable linkage conversion and isolation have been achieved, an event handler 140 may be configured to pass control of a calling event for desired data (e.g., parameter(s)) to the proxy 130. Specifically, the event handler 140 may pass control to an event handler 142 of the proxy 130, using an event control block of the event control blocks 112.

Then, a call handler 144 of the proxy 130 may proceed to invoke the application 122 to call for desired data of the data 124. Once obtained, the called data may be provided to the proxy manager 132, and ultimately to the application 120.

Once all called data has been obtained, the event handlers 140 and 142, for applications 120 and 122 respectively, may be configured to ensure that control of the calling operations is passed to the proxy manager 128. Then, the isolation manager 138 may be configured to detach entirely from the environment 118, until if and when additional data is required to be called from the environment 118 or the application 122.

Advantageously, in the example of FIG. 1 as described above, no changes are required to the application 122, which may be the type of legacy application referenced and described above. For example, the application 122 may represent a COBOL application or service providing functionalities with respect to millions of customers in a fast and reliable manner and avoiding a change to the application 122 because changing the application 122 may be associated with significant cost, risk, and inconvenience.

Nonetheless, it is possible to modify the application 122 to perform the same or similar functionalities described herein with respect to the proxy 130. In such cases, for example, the modified and re-compiled application 122 may be executed within the environment 118, which may be isolated from the environment 116, in a same or similar manner as described with respect to FIG. 1, above, using the isolation manager 138 and separate task control block 114*b*.

In still other example implementations, the application 122 may be executed independently of the environment 118. In such cases, the isolation manager 138 may not be needed, and the linkage converter 136 may pass the called parameters directly to the proxy 130 or to the application 122.

Figure 2:
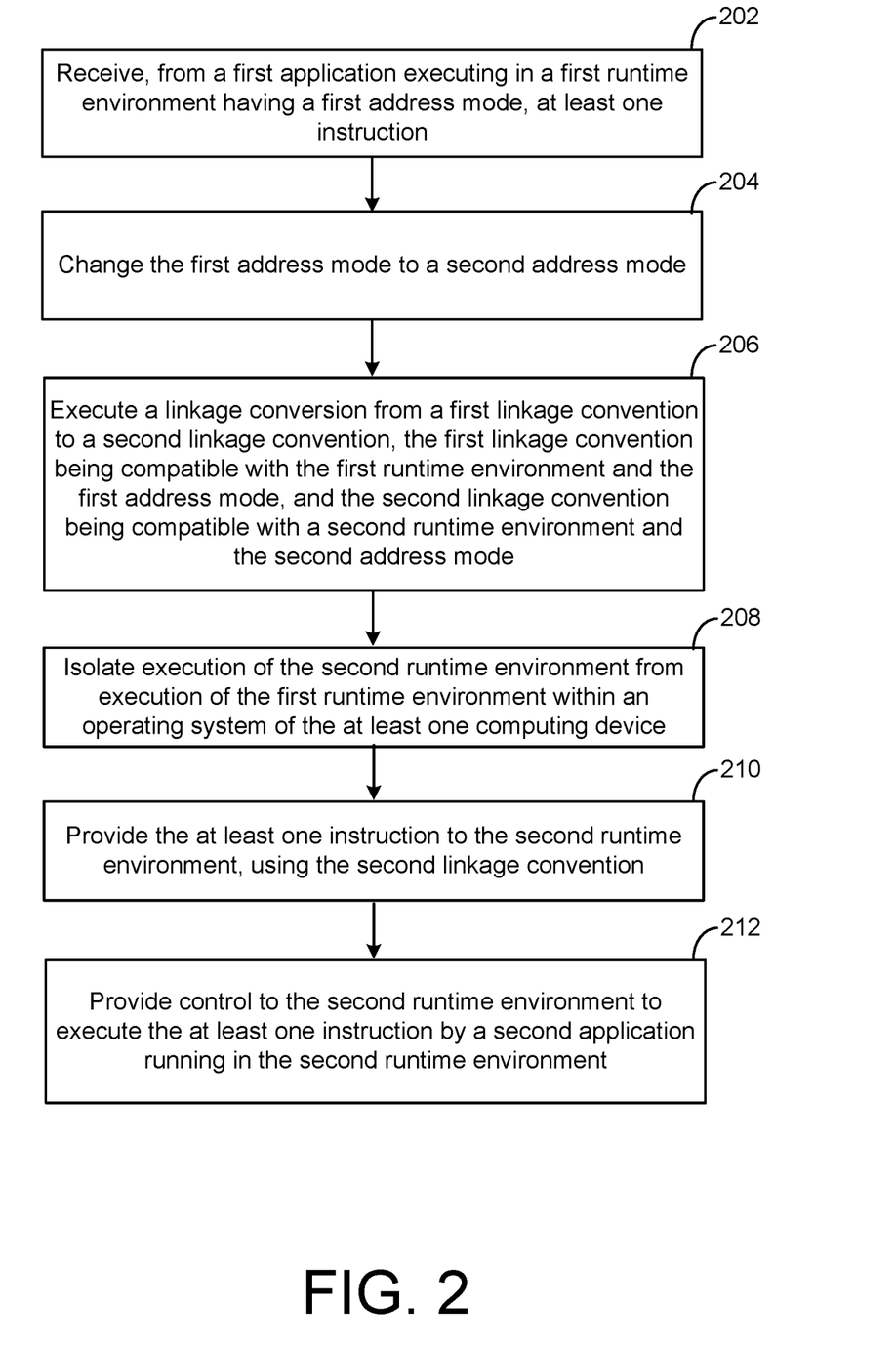
FIG. 2 is a flowchart illustrating example operations of the monitoring system of FIG. 1.

FIG. 2 is a flowchart illustrating example operations of the monitoring system of FIG. 1. In the example of FIG. 2, operations 202-212 are illustrated as separate, sequential operations. In various implementations, the operations 202-212 may include sub-operations, may be performed in a different order, may include alternative or additional operations, or may omit one or more operations. Further, in all such implementations, included operations may be performed in an iterative, looped, nested, or branched fashion.

In FIG. 2, at least one instruction may be received from a first application executing in a first runtime environment having a first address mode (202). For example, the proxy manager 128 of FIG. 1 may receive a parameter, or multiple parameters, from the application 120, to be obtained from the application 122 and data 124. As described, the environment 116 may represent a runtime environment, such as a LE, and the environment 116 and the application 120 may be implemented in a 64-bit address mode.

The first address mode may be changed to a second address mode (204). For example, the address mode handler 132 may convert the 64-bit address mode to a 31-bit address mode.

A linkage conversion from a first linkage convention to a second linkage convention may be executed, where the first linkage convention is compatible with the first runtime environment and the first address mode, and the second linkage convention is compatible with a second runtime environment and the second address mode (206). For example, the instruction handler 134 may receive an identification (e.g., memory location) of desired parameter(s) expressed using a first linkage convention, such as) (PLINK. The linkage converter 136 may then convert the identification of the desired parameter(s) into a second linkage convention, such as standard linkage.

Execution of the second runtime environment may be isolated from execution of the first runtime environment within an operating system of the at least one computing device (208). For example, the isolation manager 138 may execute an ATTACH command, macro, and/or request to attach the environment 118. Such an ATTACH command creates a second task control block 114*b* for the environment 118, which is separate from the task control block 114*a* of the environment 116. By using separate task control blocks 114*a* and 114*b* of the task control blocks 114, the isolation manager 138 may ensure that operations of the environments 116 and 118 do not conflict or interfere with one another.

The at least one instruction may be provided to the second runtime environment, using the second linkage convention (210). For example, the linkage converter 136 may forward the parameter(s) requested by the application 120.

Control may be provided to the second runtime environment to execute the instruction by a second application running in the second runtime environment (212). For example, to execute a call for at least one parameter value of at least one parameter. For example, the event handler 140 may transfer control to the proxy 130 (e.g., to the event handler 142) using a POST/WAIT technique in conjunction with corresponding event control blocks 112, and as described in detail, below, with respect to FIGS. 3 and 4. Accordingly, the call handler 144 of proxy 130 may execute a call to the application 122 in the environment 118 to obtain requested parameter values.

When the instruction includes a call for at least one parameter value of a parameter, the at least one parameter value may be received using the second linkage convention. For example, the proxy 130 may forward the at least one parameter value to the proxy manager 128. As described in detail, below, when multiple parameters are requested, all of the parameters may be collected at the proxy 130 while control resides with the proxy 130, and then passed together to the proxy manager 128 when control is returned to the proxy manager 128. When all requested parameter values have been returned, the environment 118 may be detached from the proxy manager 128 by the isolation manager 138, e.g., by removing the task control block 114*b*.

Thus, in various examples, the application 120 is not required to provide a parameter and/or request a corresponding parameter value to be returned from the application 122. For example, the application 120 may provide any instruction capable of being performed by the application 122, which need not imply or require that the application 122 provide a corresponding value in return or upon completion of the provided instruction.

Figure 3:
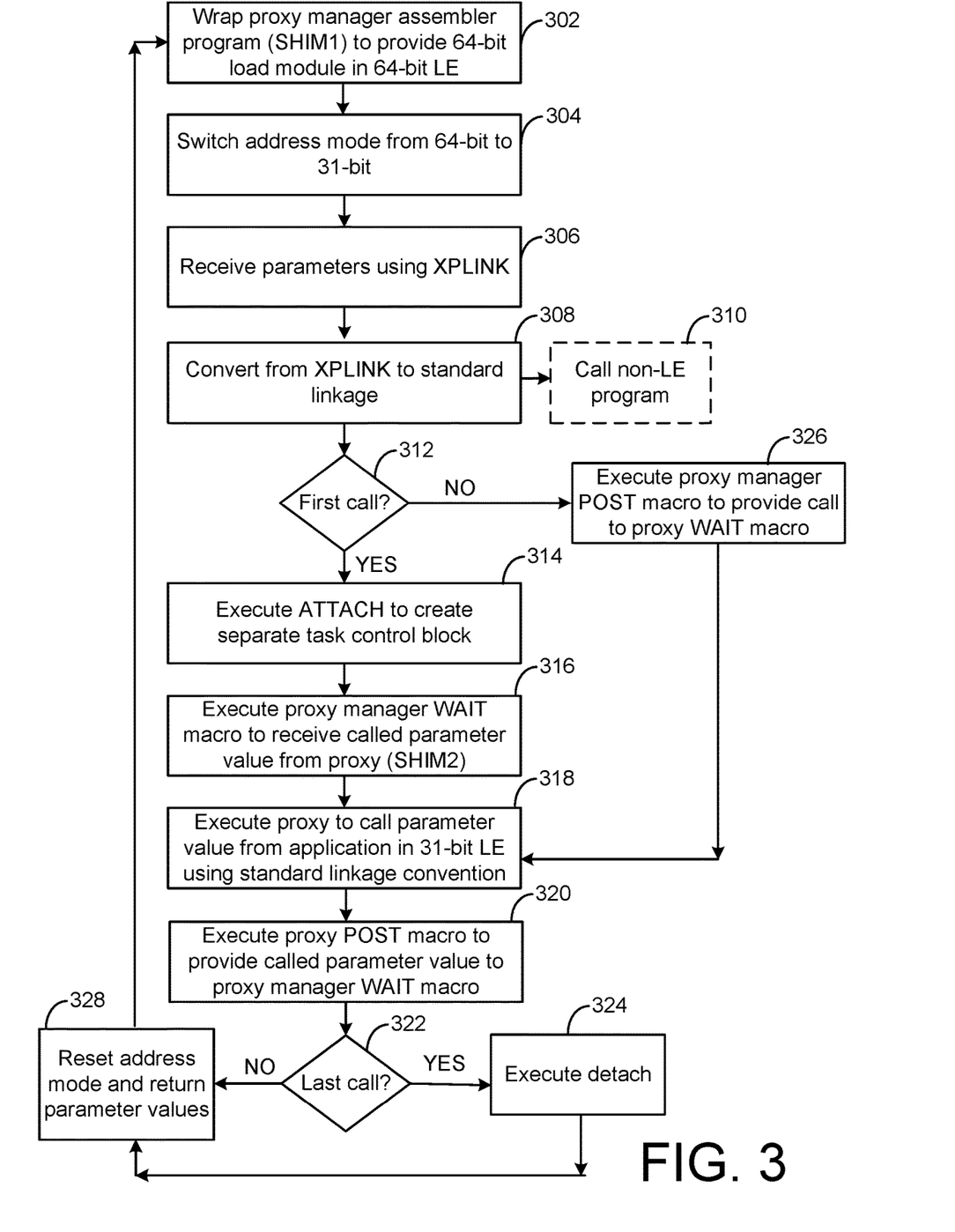
FIG. 3 is a flowchart illustrating a more detailed example of the examples of FIGS. 1 and 2.

FIG. 3 is a flowchart illustrating a more detailed example of the examples of FIGS. 1 and 2. In FIG. 3, the proxy manager 128 and the proxy 130 are implemented using two separate SHIMS, referred to as SHIM1 and SHIM2. A SHIM is a library that transparently intercepts API calls and changes the arguments passed, handles the operation itself or redirects the operation elsewhere. Shims can be used, for example, to support an old API in a newer environment, or a new API in an older environment. For example, a SHIM may refer to the use of a library that intercepts calls and performs various operations on, or using, the intercepted calls. For example, a SHIM may incorporate one or more existing macros, where a macro refers to a predefined sequence of instructions for performing a specified task. In various examples below, macros are described as being used with the proxy manager 128 to perform some of the functions described above with respect to FIG. 1.

For example, in FIG. 3, the proxy manager 128 may be implemented as SHIM1, written as an Assembler language program and wrapped with a prologue macro (referred to herein and shown in FIG. 4 as PRLG) and an epilog macro (shown in FIG. 4 and referred to herein as EPLG), which enable the proxy manager 128 as an Assembler language program to operate in the 64-bit address mode of the environment 116, as described herein. Specifically, such macros may be used to wrap the proxy manager 128, implemented as SHIM1, to provide a 64-bit load module for the 64-bit LE represented by the environment 116.

Then, a suitable instruction may be used to switch an address mode of the proxy manager 128 (SHIM1) from 64-bit to 31-bit (304). In this way, a plurality of parameters may be received, using a suitable linkage convention, such as XPLINK (306). For example, XPLINK may be implemented using an existing macro as well.

Then, memory locations for the requested parameters may be expressed in standard linkage by converting the XPLINK expressions to standard linkage (308), e.g., using the linkage converter 136. Specific and detailed examples for providing such linkage conversion are provided below, in the context of FIG. 4.

Once standard linkage has been used to designate memory locations to be used for the specified parameters and parameter values, it is possible to simply call any program that is not running in a runtime environment that requires isolation (310) as described herein. For example, a call may be made to an Assembler language program not running in LE.

However, if the second runtime environment 118 is being used as illustrated and described with respect to FIGS. 1 and 2, and if the call is a first call for a first parameter (312), then the isolation manager 138 of FIG. 1 may be configured to execute an ATTACH command to create the separate task control block 114b for the environment 118 and thereby isolate the environment 118 (314). In this context, isolation refers to and includes an ability of the environments 116 and 118 to execute independently and/or in parallel with one another. For example, as control is passed between the proxy manager 128 and the proxy 130, as described herein, the controlling entity has an ability to perform its designated functions, without influencing or interfering with performance of the other entity's functions.

In FIG. 3, the proxy manager 128, e.g., the event handler 140, may execute a proxy manager WAIT macro (316) as part of a POST/WAIT operation for transferring control between the proxy manager 128 and the proxy 130. For example, the proxy 130 may also be implemented as a SHIM, referred to herein as SHIM2, and the proxy manager WAIT macro may cause the proxy manager 128 (SHIM1) to wait while requested parameter values are called by the proxy 130 (SHIM2) and until those requested parameter values are posted back to the proxy manager 128 by the proxy 130, as described below.

While control resides with the proxy 130, the proxy 130 may proceed to execute calls for the requested parameter values from the application 122, which may be a 31-bit LE application, using standard linkage conventions (318), as described herein. The application 122 may perform whatever work is specified and required for returning the desired parameter value.

The proxy 130 (SHIM2) may then return the obtained parameter value, including executing a proxy POST macro for which the proxy manager WAIT macro is waiting (320). In a scenario in which only one call and associated parameter or parameter value is required, so that the first call is the last call (322), then the isolation manager 138 may proceed to perform a DETACH command to remove the separate task control block 114b. Then, the proxy manager 128 may proceed to reset the address mode from 31-bit to 64-bit and use the epilog macro referenced above to return the obtained parameter value (328).

In many cases, however, there may be multiple calls for multiple parameters. Although such calls may be implemented separately using the techniques just described for a single call or parameter, it is more efficient to execute multiple calls to obtain all required parameters while the environment 118 is suitably isolated from the environment 116.

For example, in FIG. 3, if the current call is not the first call (312) and not the last call (322), and the application 120 calls the environment bridge 126 again, then the proxy manager 128 may execute a proxy manager POST macro to provide the current call to the proxy WAIT macro (326). Because the last call has not been reached (322), the proxy manager 128 resets the address mode to 64-bit and returns the requested parameter values (328), and then the process returns to receive the next call (302). Once the last call is received (322), as referenced above, the isolation manager 138 may proceed to perform a DETACH command to remove the separate task control block 114b (324), reset the address mode from 31-bit to 64-bit, and, if not already returned, use the epilog macro referenced above to return the obtained parameter value (328).

Figure 4:
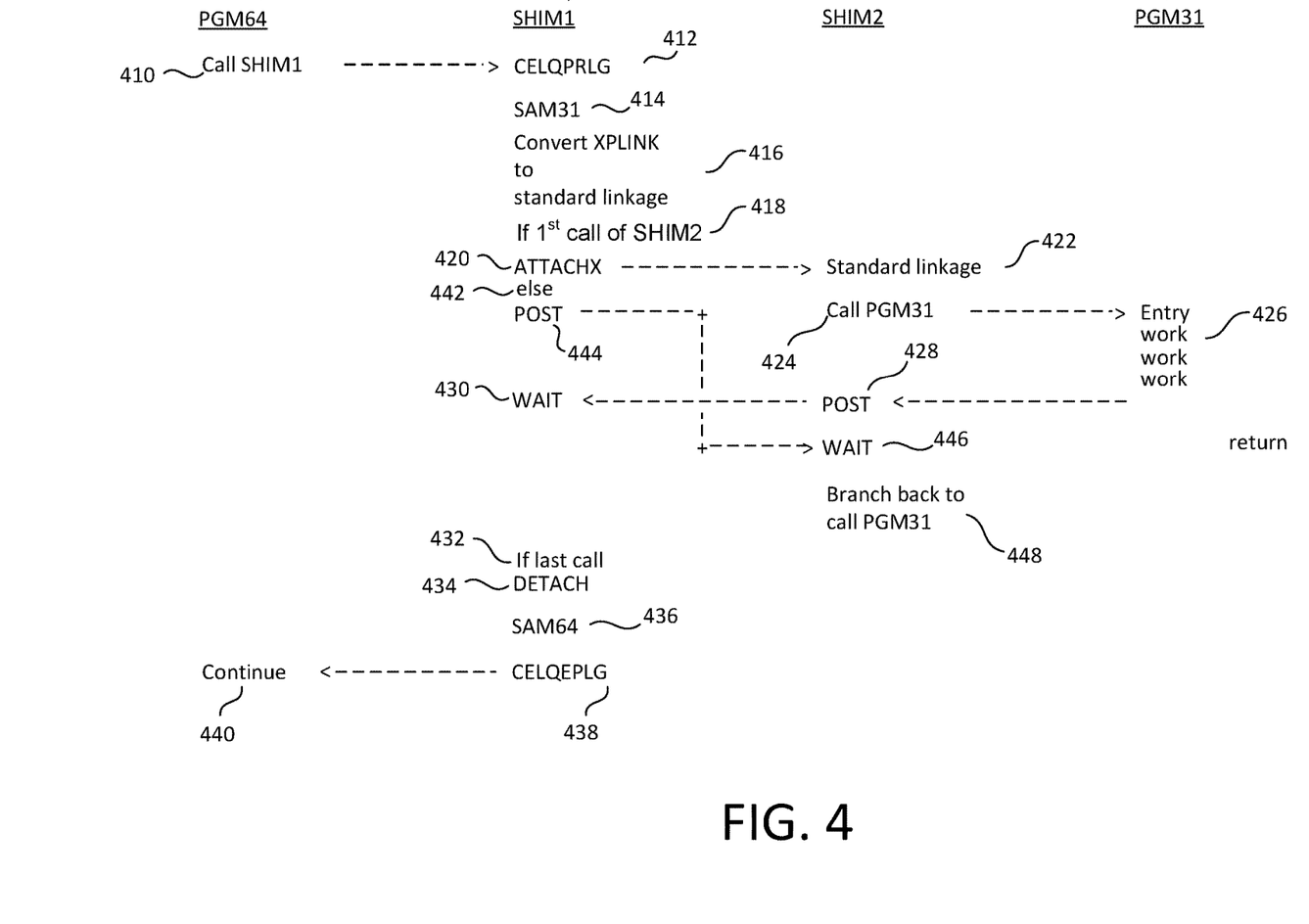
FIG. 4 is a timing diagram illustrating a more detailed example of the example of FIG. 3.

FIG. 4 is a timing diagram illustrating a more detailed example of the example of FIG. 3. In FIG. 4, a 64-bit program illustrated as PGM64 402 represents an example of the application 120 running in a 64-bit LE as an example of the environment 116. As referenced above with respect to FIG. 3, SHIM1 404 represents an example of the proxy manager 128 of FIG. 1, and SHIM2 406 represents an example of the proxy 130 of FIG. 1. A 31-bit program illustrated as PGM31 408 represents an example of the application 122 running in a 31-bit LE as an example of the environment 118.

For example, new software may be developed in Java to be executed in a 64-bit Java Virtual Machine (JVM), which may have a need to invoke a legacy application using a 31-bit LE. More generally, virtually any 64-bit LE application that requires the invocation of a 31-bit LE application can use the techniques described herein to establish communication between these two environments, including applications written in any of, e.g., Assembler, C/C++, COBOL, Java, and PL/I languages.

Consistent with the example of FIG. 3, PGM64 402 is not able to load and call PGM31 408, because PGM31 is not recognized as a 64-bit LE program. To enable the desired invocation, SHIM1 404 uses macro CELQPRLG 412 (as an example of a prolog macro for a 64-bit Assembler language program) for entry, and macro CELQEPLG 438 (as an example of an epilog macro for a 64-bit Assembler language program) for exit. As described above, macros 412 and 438 allow PGM64 402 to recognize SHIM1 404 as a 64-bit LE program using)(PLINK.

Then, SHIM1 404 executes an instruction for Set Address Mode 31 (SAM31) 414 to switch to 31-bit addressing mode. SHIM1 404 then converts)(PLINK to standard linkage 416. More detailed examples of techniques for linkage conversion are referenced above and described in detail, below.

After the conversion to standard linkage, SHIM1 404 could call a non-LE program, as referenced in operation 310 of FIG. 3. However, at this point, SHIM1 404 cannot call PGM31 408 because a 64-bit LE cannot coexist with a 31-bit LE in the same Task Control Block (TCB) of the task control blocks 114 of FIG. 1. Therefore, during a first call 418 of SHIM2 406, SHIM1 404 executes an ATTACHX of SHIM2 406 in order to create a separate TCB (e.g., the TCB 114b), proceeds with standard linkage 422 on entry to SHIM 2, and issues a WAIT command 430. As referenced above, the WAIT command 430 enables passing control to a separate task and waiting for its completion, in conjunction with a POST command 428 and using event control blocks 112. The 64-bit LE of PGM64 402 and the 31-bit LE of PGM31 408 are now unaware of, and isolated from, one another.

SHIM2 406 may then execute, using standard linkage, a call 424 for PGM31 408. The parameter list prepared by SHIM1 404 and addressed using the converted linkage convention (e.g., addressed by Register 1, as described below) may be used during the requested work 426.

Following the subsequent return of PGM 31 408 to SHIM2 406, SHIM2 406 issues a POST 428 to return to SHIM1 404. If PGM64 402 needs to invoke PGM31 408 only once (e.g., it is the last call 432), SHIM1 404 may execute a DETACH command 434 of SHIM2 406. However, as described with respect to FIG. 3, if PGM64 402 needs to get to PGM31 408 more than once 442, SHIM1 404 does not DETACH SHIM2 406 until the last call 432. More specifically, SHIM1 404 issues a POST command 444 to return control to SHIM2 406. SHIM2 406 uses a WAIT command 446 corresponding to the POST command 444 and performs a branch 448 back to the call 424 of PGM31 408.

At completion, SHIM1 404 executes a SAM64 436 to switch to 64-bit addressing mode. Then, SHIM1 404 executes the macro CELQEPLG 438 to return to PGM64 402, which may then continue 440.

As an example of the types of linkage conversion referenced above and with respect to the linkage converter 136 of FIG. 1, operation (308) of FIG. 3, and operation 416 of FIG. 4, the following description provides more detailed example techniques for the example of conversion of)(PLINK to standard linkage.

As referenced above, linkage conventions specify responsibilities of communicating programs with respect to the passing of data therebetween. For example, linkage may include the passing of parameters through the use of pointers to specified register locations (as opposed, e.g. to passing data directly). For example, in standard linkage, a register 1 may contain a pointer to a parameter list.

In contrast, in)(PLINK, register 4 is the address of the stack (not register 13, which is not used in XPLINK), and addresses 64-bit memory. Consequently, prior to calling a 31-bit application, register 13 is set up in a manner consistent with standard linkage.

In more detail, register 13 may be loaded with the address of a local work area beginning with 18 fullwords (72 bytes)(a fullword is 4 consecutive bytes or 32 bits). When calling a program, the called program may then store the caller's registers into the local work area. The registers of the calling program may be restored at completion so that when control is returned to the caller, the system is ready for the next call to begin.

In standard linkage, register 1 points to a list of addresses. For three parameters, three fullwords may be pointed to by register 1, with the last fullword having a high-order bit turned on to indicate a final parameter. In contrast, in)(PLINK, register 1 contains the address of a first parameter, while registers 2 and 3 may contain the addresses of a second and third parameter, respectively.

Therefore, the linkage converter 136 may be configured to store information in register 1, 2, and/or 3 in XPLINK in the local work area referenced above as being associated with register 13 for standard linkage, to provide a list of, e.g., three parameters. For example, register 1 may be stored in the local work area, register 2 may be stored in the local work area immediately after where register 1 was stored, register 3 may be stored in the local work area immediately after where register 2 was stored, and register 1 may be loaded with the address of where register 1 was stored, thereby becoming the address of a list of addresses.

The memory of the local work area referenced above may either be passed by the caller of the environment bridge 126, or the environment bridge 126 may obtain the memory for the local work area. Following the initial 18 fullwords, an additional fullword may be used in the local work area, for example, for every parameter that PGM64 402 needs to pass to PGM31 408. If there is more than one, the fullwords must be contiguous.

The following provides example pseudocode for the linkage converter 136, in which the above referenced additional fullwords are included as PARM1, PARM2, PARM3. The pseudocode determines the number of parameters being passed (e.g., 0 to 3 parameters) and converts their specification to standard linkage, as described above.

Pseudocode 1

If Register 1 is null, branch to PARMS ARE READY
Store the contents of Register 1 into PARM1
If Register 2 is null, set high order bit of PARM1, branch to PARMS ARE READY
Store the contents of Register 2 into PARM2
If Register 3 is null, set high order bit of PARM2, branch to PARMS ARE READY
Store the contents of Register 3 into PARM3
Set the high order bit of PARM3
PARMS ARE READY:
Load address of PARM1 into Register 1

If there are more than three parameters, the linkage converter 136 may be configured to handle the precise number of parameters being used. For example, pseudocode 2 provides an example implementation using 6 parameters, in which the address mode is set to 64-bit because register 4 contains a 64-bit address, and in which the contents of registers 1, 2, and 3 are duplicated by XPLINK in the three fullwords at Register 4+x'840':

Pseudocode 2

Switch to 64-bit addressing mode
Store the fullword at Register 4+x'840' into PARM1

Store the fullword at Register 4+x'844' into PARM2
Store the fullword at Register 4+x'848' into PARM3
Store the fullword at Register 4+x'84C' into PARM4
Store the fullword at Register 4+x'850' into PARM5
Store the fullword at Register 4+x'854' into PARM6
Set the high order bit of PARM6
Switch to 31-bit addressing mode
Load address of PARM1 into Register 1

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, being tangibly embodied on a non-transitory computer-readable storage medium and comprising instructions that, when executed by at least one computing device, are configured to cause the at least one computing device to:
   receive, from a first application executing in a first runtime environment having a first address mode, at least one instruction;
   change the first address mode to a second address mode;
   execute a linkage conversion from a first linkage convention to a second linkage convention, wherein the first linkage convention is compatible with the first runtime environment and the first address mode, and wherein the second linkage convention is compatible with a second runtime environment and the second address mode;
   isolate execution of the second runtime environment from execution of the first runtime environment within an operating system of the at least one computing device;
   provide the at least one instruction to the second runtime environment using the second linkage convention; and
   provide control to the second runtime environment to execute the at least one instruction by a second application executing in the second runtime environment.

2. The computer program product of claim 1, wherein the first address mode is a 64-bit address mode, and wherein the second address mode is a 31-bit address mode.

3. The computer program product of claim 1, wherein the first linkage convention is XPLINK, and wherein the second linkage convention is standard linkage.

4. The computer program product of claim 1, wherein the instructions that, when executed by the at least one computing device, are further configured to cause the at least one computing device to:
   execute an attach command to isolate the execution of the second runtime environment including creating a task control block for the second runtime environment.

5. The computer program product of claim 4, wherein the instructions that, when executed by the at least one computing device, are further configured to cause the at least one computing device to:

issue a wait command to wait for a posting of availability of at least one parameter value by the second runtime environment, in response to the execution of the at least one instruction.

6. The computer program product of claim 4, wherein the instructions that, when executed by the at least one computing device, are further configured to cause the at least one computing device to:
execute a detach command when a first call is a final call issued by the first application, thereby to remove the task control block for the second runtime environment.

7. The computer program product of claim 6, wherein the instructions that, when executed by the at least one computing device, are further configured to cause the at least one computing device to:
execute a second call following the attach command prior to the detach command, including issuing a wait command at the second runtime environment to receive the second call when posted from the first runtime environment.

8. The computer program product of claim 1, wherein the instructions that, when executed by the at least one computing device, are further configured to cause the at least one computing device to:
switch an address mode from the second address mode to the first address mode; and
return at least one parameter value to the first application, wherein the at least one parameter value is obtained in response to the execution of the at least one instruction.

9. The computer program product of claim 1, wherein the first runtime environment and the second runtime environment are implemented using Language Environment (LE).

10. The computer program product of claim 1, wherein the at least one instruction includes an instruction to call at least one parameter value for at least one parameter, and wherein the instructions that, when executed by the at least one computing device, are further configured to cause the at least one computing device to:
receive the at least one parameter value, using the second linkage convention.

11. A computer-implemented method comprising:
receiving, from a first application executing in a first runtime environment having a first address mode, at least one instruction;
changing the first address mode to a second address mode;
executing a linkage conversion from a first linkage convention to a second linkage convention, wherein the first linkage convention is compatible with the first runtime environment and the first address mode, and wherein the second linkage convention is compatible with a second runtime environment and the second address mode;
isolating execution of the second runtime environment from execution of the first runtime environment within an operating system of the at least one computing device;
providing the at least one instruction to the second runtime environment using the second linkage convention; and
providing control to the second runtime environment to execute the at least one instruction by a second application executing in the second runtime environment.

12. The computer-implemented method of claim 11, wherein the first address mode is a 64-bit address mode, and wherein the second address mode is a 31-bit address mode.

13. The computer-implemented method of claim 11, wherein the first linkage convention is XPLINK, and wherein the second linkage convention is standard linkage.

14. The computer-implemented method of claim 11, further comprising:
executing an attach command to isolate the execution of the second runtime environment including creating a task control block for the second runtime environment.

15. The computer-implemented method of claim 14, further comprising:
executing a detach command when a first call is a final call issued by the first application, thereby to remove the task control block for the second runtime environment.

16. The computer-implemented method of claim 11, further comprising:
switching an address mode from the second address mode to the first address mode; and
returning at least one parameter value to the first application, wherein the at least one parameter value is obtained in response to the execution of the at least one instruction.

17. The computer-implemented method of claim 11, wherein the first runtime environment and the second runtime environment are implemented using Language Environment (LE).

18. A mainframe system comprising:
at least one memory including instructions; and
at least one processor that is operably coupled to the at least one memory and that is arranged and configured to execute instructions that, when executed, cause the at least one processor to:
receive, from a first application executing in a first runtime environment having a first address mode, at least one instruction;
change the first address mode to a second address mode;
execute a linkage conversion from a first linkage convention to a second linkage convention, wherein the first linkage convention is compatible with the first runtime environment and the first address mode, and wherein the second linkage convention is compatible with a second runtime environment and the second address mode;
isolate execution of the second runtime environment from execution of the first runtime environment within an operating system of the at least one computing device;
provide the at least one instruction to the second runtime environment using the second linkage convention; and
provide control to the second runtime environment to execute the at least one instruction by a second application executing in the second runtime environment.

19. The mainframe system of claim 18, wherein the first address mode is a 64-bit address mode, and wherein the second address mode is a 31-bit address mode.

20. The mainframe system of claim 18, wherein the first linkage convention is XPLINK, wherein the second linkage convention is standard linkage, and wherein the first runtime environment and the second runtime environment are implemented using Language Environment (LE).

* * * * *